United States Patent
Gerdes et al.

(10) Patent No.: US 10,491,004 B2
(45) Date of Patent: Nov. 26, 2019

(54) SYSTEMS AND METHODS FOR CONTROLLING POWER OUTPUT TO A LOAD BY MULTIPLE GENSETS BASED ON LOAD OPERATION MODES

(71) Applicant: Caterpillar Inc., Peoria, IL (US)

(72) Inventors: Josenia Gerdes, Dunlap, IL (US); Vijay Janardhan, Dunlap, IL (US); Edward Schroeder, Germantown Hills, IL (US); Stephen Nofsinger, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 200 days.

(21) Appl. No.: 15/297,843

(22) Filed: Oct. 19, 2016

(65) Prior Publication Data

US 2018/0109110 A1   Apr. 19, 2018

(51) Int. Cl.
| | |
|---|---|
| H02J 7/34 | (2006.01) |
| H02J 1/10 | (2006.01) |
| H02J 3/38 | (2006.01) |
| H02K 7/18 | (2006.01) |
| H02J 3/46 | (2006.01) |
| F02B 63/04 | (2006.01) |

(52) U.S. Cl.
CPC ............. *H02J 3/381* (2013.01); *H02J 3/46* (2013.01); *H02K 7/1815* (2013.01); *F02B 63/04* (2013.01)

(58) Field of Classification Search
CPC .... H02J 3/38; H02J 3/381; H02J 3/46; H02K 7/1807; H02K 7/1815; F02B 63/04

USPC .......... 307/8, 16, 43, 52, 53, 57, 76, 84, 153
See application file for complete search history.

(56) References Cited

U.S. PATENT DOCUMENTS

| | | | |
|---|---|---|---|
| 6,107,927 A | 8/2000 | Dvorsky et al. | |
| 7,460,930 B1 | 12/2008 | Howell et al. | |
| 8,232,892 B2 | 7/2012 | Overholt et al. | |
| 2009/0312885 A1* | 12/2009 | Buiel ................. | H02J 3/32 700/297 |
| 2009/0321141 A1* | 12/2009 | Kotsonis ............ | E21B 4/04 175/67 |
| 2010/0102637 A1* | 4/2010 | Dozier ............... | H02J 3/46 307/84 |
| 2010/0156191 A1* | 6/2010 | Dozier ............... | H02J 3/38 307/81 |
| 2011/0074165 A1 | 3/2011 | Grimes et al. | |
| 2011/0320053 A1* | 12/2011 | Dozier ............... | H02J 3/38 700/287 |

(Continued)

*Primary Examiner* — Richard Tan
(74) *Attorney, Agent, or Firm* — L. Glenn Waterfield

(57) ABSTRACT

A control system for a plurality of generator sets (gensets) includes a plurality of controllers and a data link. Each of the plurality of controllers is operatively associated with at least one of the plurality of gensets. The plurality of controllers is configured to control power output of each of the plurality of gensets, based on a plurality of operating modes. Each of the plurality of operating modes is configured for a power consumption scenario associated with the load. The datalink connects each of the plurality of controllers to at least one other controller of the plurality of controllers. The plurality of controllers is further configured to select a current operating mode, from the plurality of operating modes, for the plurality of gensets and control power output of at least one of the plurality of gensets based on the current operating mode.

20 Claims, 7 Drawing Sheets

(56) References Cited

U.S. PATENT DOCUMENTS

2015/0180280 A1* 6/2015 Frampton ................. H02J 3/48
                                                            307/53
2015/0368566 A1   12/2015 Young et al.
2016/0006256 A1*  1/2016 Muller ............... G05B 19/0425
                                                            307/84

* cited by examiner

SYSTEMS AND METHODS FOR CONTROLLING POWER OUTPUT TO A LOAD BY MULTIPLE GENSETS BASED ON LOAD OPERATION MODES

TECHNICAL FIELD

The present disclosure generally relates to systems and methods for controlling power output to a load and, more particularly, to control systems and methods for controlling power output, of multiple generator sets, to a load.

BACKGROUND

A wide variety of industries utilize generator sets, also referred to as "gensets," to provide power to a load at an industrial site. The load may include any systems, machines, and/or devices at the industrial site which desire or require electrical power. A genset, generally, may include a generator and a prime mover, such as an engine. As the engine of the genset operates, the mechanical rotation of said engine may drive the generator, thus producing electrical power. Gensets are often configured such that, when running at a given power level, the engine of the genset will drive the generator with a substantially consistent torque and speed, thereby producing electrical power output having substantially consistent characteristics, such as, but not limited to, frequency and voltage.

In some genset applications, the level of power desired or demanded by the load is greater than the level of power that a single, available genset is capable of providing to the load. Accordingly, in such situations, multiple gensets may be connected, in parallel, to meet the power demands of the load. When operating a plurality of gensets to power a load, preferably, the power demand would remain relatively constant and, therefore, all available gensets would be continuously functional, producing electrical power at optimum efficiency. However, in practice, power demands for a load may fluctuate as sub-loads of the load are activated and deactivated, therefore, requiring the number of gensets online or offline to vary, at any given time. Similarly, in certain industrial applications, different working conditions and/or operations at the industrial site may alter the desired power input for the load, thusly requiring addition or removal of gensets from active power generation. Accordingly, control systems for multiple gensets are utilized to regulate power output to the load from the multiple gensets.

In some prior control systems for power generators, such as those disclosed in U.S. Patent Application Publication No. 2009/0312885 ("Management System for Drilling Rig Power Supply and Storage System"), a power generation controller may monitor a load and store and/or provide supplemental power, based on recommended power settings. However, such prior art power systems may be susceptible to inefficiencies or even failure, if such supplemental power is not sufficient or if it is beyond the receivable capacity of the load. In certain industries, inadequate or inaccurate power provided to the load may cause disruptions in industrial operations and even equipment damage.

Therefore, to efficiently control power input to a load from multiple gensets, genset control systems and methods, which utilize industry and/or operation customized operation modes, are desired.

SUMMARY

In accordance with one aspect of the disclosure, a control system for a plurality of generator sets (gensets) is disclosed. The plurality of gensets may be configured to provide power to a load. The system may include a plurality of controllers and a data link. Each of the plurality of controllers may be operatively associated with at least one of the plurality of gensets and each of the plurality of gensets may be operatively associated with at least one of the plurality of controllers. The plurality of controllers may be configured to control power output, to the load, of each of the plurality of gensets, based on a plurality of operating modes. Each of the plurality of operating modes may be configured for a power consumption scenario associated with the load. The datalink may connect each of the plurality of controllers to at least one other controller of the plurality of controllers. The plurality of controllers may further be configured to select a current operating mode, from the plurality of operating modes, for the plurality of gensets and control power output of at least one of the plurality of gensets based on the current operating mode.

In accordance with another aspect of the disclosure, a power system for providing electrical power to an external load is disclosed. The power system may include a plurality of gensets, a transmission network, a plurality of controllers, and a datalink. The plurality of gensets may be configured to generate electrical power for the external load. The transmission network may be configured to provide the electrical power generated by the plurality of gensets to the external load. Each of the plurality of controllers may be operatively associated with at least one of the plurality of gensets and each of the plurality of gensets may be operatively associated with at least one of the plurality of controllers. The plurality of controllers may be configure to control power output, to the external load, of each of the plurality of gensets, based on a plurality of operating modes. Each of the plurality of operating modes may be configured for a power consumption scenario associated with the external load. The datalink may connect each of the plurality of controllers to at least one other controller of the plurality of controllers. The plurality of controllers may further be configured to select a current operating mode, from the plurality of operating modes, for the plurality of gensets and control power output of at least one of the plurality of gensets based on the current operating mode.

In accordance with yet another aspect of the disclosure, a method for controlling power output to a load by a plurality of gensets is disclosed. The method may include providing a plurality of operating modes, each of the plurality of operating modes configured for a power consumption scenario associated with the load. The method may further include selecting a current operating mode, from the plurality of operating modes, for the plurality of gensets. The method may further include communicating, amongst a plurality of controllers, to determine optimal genset control operations based on the current operating mode, each of the plurality of controllers operatively associated with at least one of the plurality of gensets. The method may further include controlling power output of at least one of the plurality of gensets based on the current operating mode and the optimal genset control operations.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
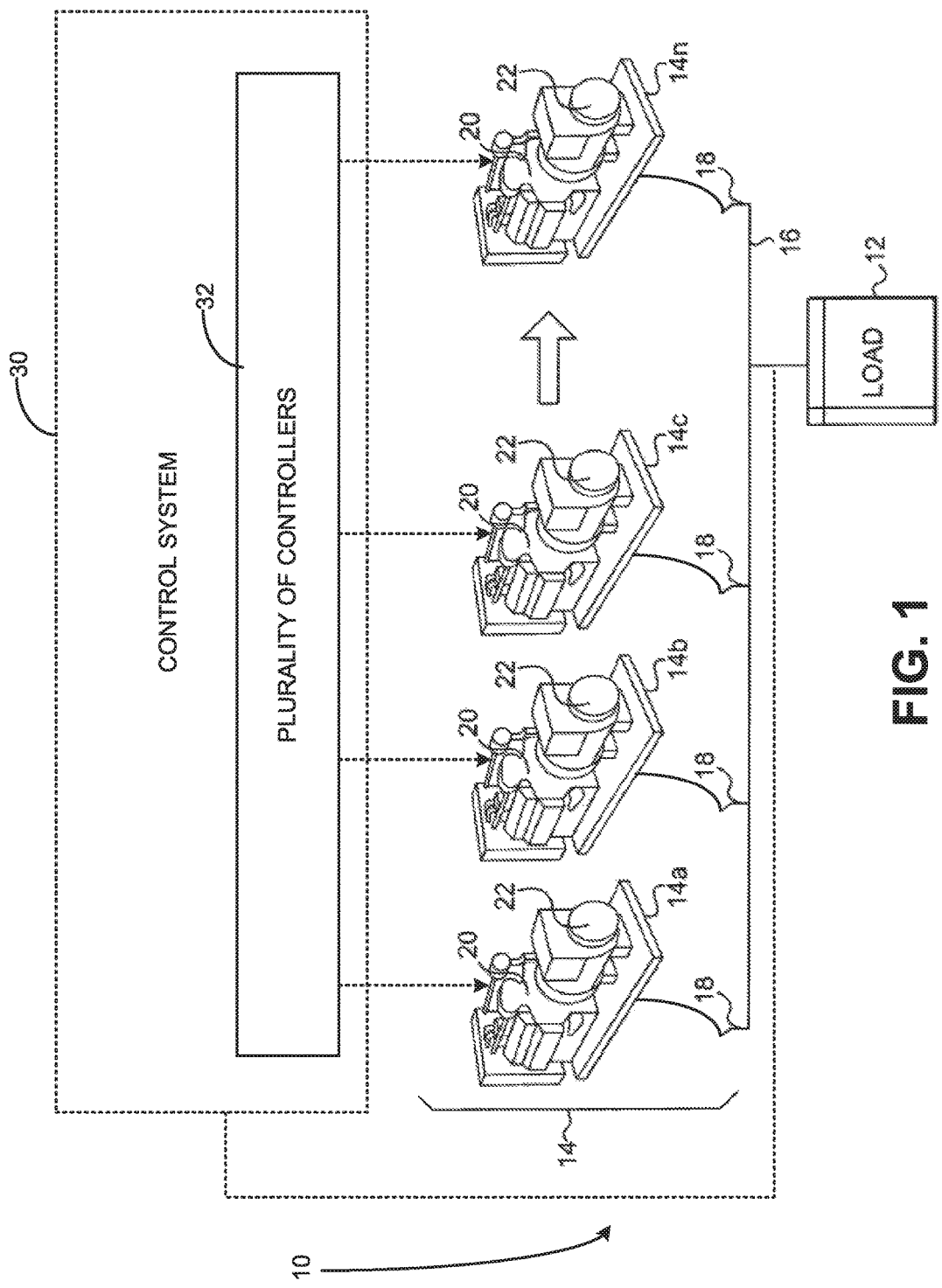
FIG. 1 is a schematic diagram of an example power system, in accordance with an embodiment of the disclosure.

Turning now to the drawings and with specific reference to FIG. 1, an example power system 10 is shown. The power system 10 may be configured to provide primary power and/or backup power to an external load 12. In some examples, backup power may include an immediate supply of reserve power provided to the external load 12 when power supplied from a utility power grid (not shown) is interrupted.

As shown in the example depiction of FIG. 1, the power system 10 may include a plurality of generator sets (gensets) 14, including, but not limited to including, a first genset 14a, a second genset 14b, and a third genset 14c. Of course, the plurality of gensets 14 may include fewer than the three gensets 14a, 14b, and 14c or the plurality of gensets 14 may include any number of additional gensets 14 up to "n" number of gensets 14n. Each of the gensets 14 may be connected to each other and connected to the external load 12 by way of a power transmission network 16 and a plurality of connections 18.

The external load 12 may be any type of power consuming system and/or device configured to receive electrical power supplied by the gensets 14, thereby utilizing the electrical power from the gensets 14 to perform some type of task. External loads may include, but are not limited to including, lights, motors, heating elements, electronic circuitry, refrigeration devices, air conditioning units, computer servers, heating equipment, motorized pulley systems, drilling equipment, positioning actuators, etc. For example, the external load 12 may include one or more systems and/or devices that utilize uninterrupted electrical power to perform one or more critical and/or sensitive tasks. Accordingly, in some such examples, electrical loads 12 that utilize uninterrupted power may include, but are not limited to including, loads found in hospitals, airports, computer servers, telecommunication installations, oil rig sites, drilling operations, and/or any industrial applications.

The transmission network 16 may be any electrical transmission system for distributing electrical power produced by the gensets 14 to the external load 12. For, example, the transmission network 16 may include a system including power stations, transmission lines, connection equipment (e.g., transformers, electrical switches, power relays, circuit breakers, and the like), and other suitable devices for distributing electrical power across a power grid, as known in the art. In some examples, portions or elements of the transmission network 16 may be buried underground and/or run overhead via transmission towers.

For connecting the transmission network 16 to the gensets 14, the connections 18 may include any type of electrical connector or system that is capable of coupling together one or more of the gensets 14 and the external load 12. For example, connections 18 may include various switching devices, junction boxes, circuit interrupting devices, fuses, or any other components that may be suitable for electrically interconnecting one or more systems. Connections 18 may additionally or alternatively include a voltage transformer and/or power synchronizer configured to reduce or otherwise condition the power provided by gensets 14 to a suitable level for use by conventional consumer devices.

Each of the gensets 14 may include components that operate to generate electricity. For example, each genset 14 may include a prime mover 20 configured to be coupled with a generator 22, such that the prime mover 20 mechanically rotates the generator 22 to generate electrical power to provide to the external load 12. In the present example, the prime mover 20 is depicted and described as a heat engine such as, for example, a combustion engine. However, the prime mover 20 may be any type of combustion engine such as, but not limited to, a diesel engine, a gasoline engine, and/or a gaseous fuel-powered engine.

The generator 22 may be, for example, an alternating current (AC) generator, a permanent-magnet generator, an AC synchronous generator, or a switched-reluctance generator that is mechanically driven by prime mover 20 to produce electrical power. In an example, the generator 22 may include multiple pairings of poles (not shown), each pairing having three phases arranged on a circumference of a stator (not shown) to produce an alternating current. Electrical power produced by the generator 22 may be directed for offboard purposes to the external load 12.

While the gensets 14 and their respective components are described as similar to one another, it is to be understood that one or more of the gensets 14 may be substantially different from one or more others of the gensets 14, within the same power system 10. Accordingly, one or more of the gensets 14 may have a greater or lesser electrical power output capacity than another of the gensets 14. As such, the gensets 14 may each be operated and controlled differently, depending on their respective electrical power output, if desired.

To control and/or regulate operation of the gensets 14 and their power output to the load 12, the power system 10 may include, or be otherwise operatively associated with, a control system 30. The control system 30, as shown in FIG. 1, may provide instructions to each of the plurality of gensets 14, while also receiving information, regarding operation characteristics of the load 12, from, for example, the transmission network 16. Such operation characteristics may include, but are not limited to including, a sensed voltage at the input of the load 12, a sensed current at the input of the load 12, a power demand of the load 12, and/or any other characteristics associated with the load 12 of the electrical power desired or provided thereto.

Figure 2:
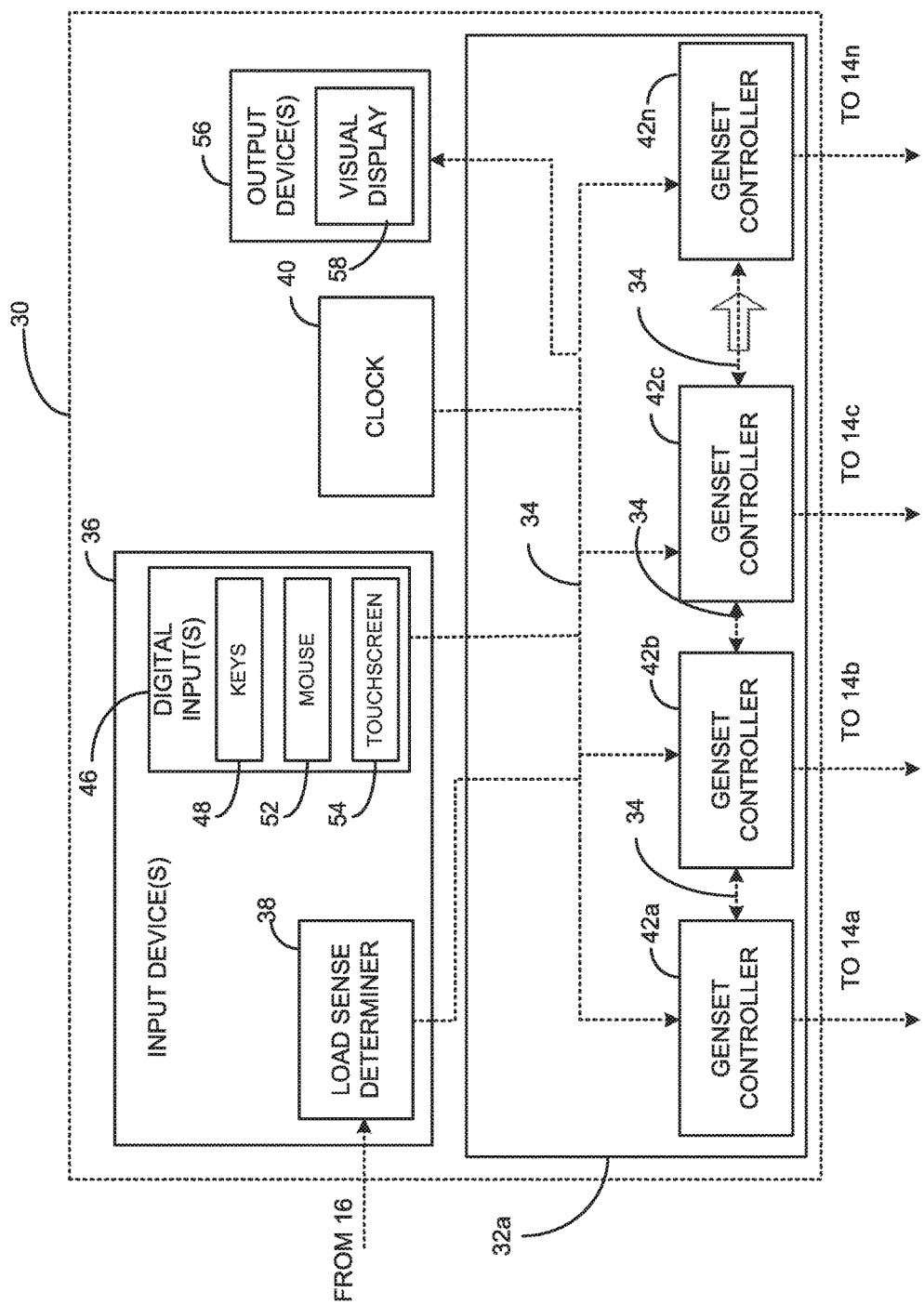
FIG. 2 is a schematic block diagram of an example control system of, or associated with, the power system of FIG. 1, in accordance with FIG. 1 and an embodiment of the present disclosure.
Figure 3:
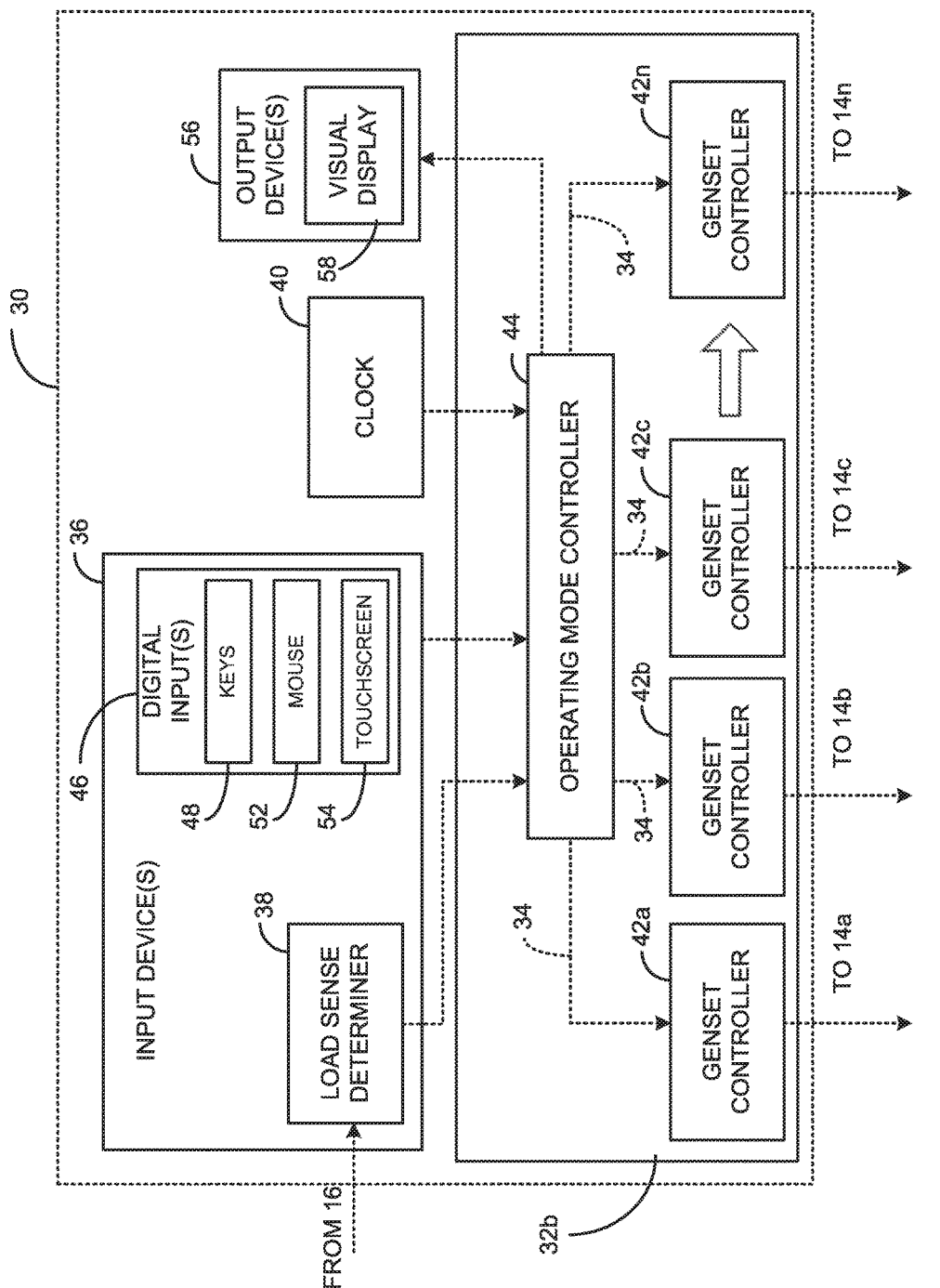
FIG. 3 is another schematic block diagram of the example control system of, or associated with, the power system of FIG. 1, featuring an alternative controller configuration, in accordance with FIG. 1 and an embodiment of the present disclosure.

As shown in FIG. 1 and further depicted in the block diagrams illustrating the example control system 30 of FIGS. 2 and 3, the control system 30 may include a plurality of controllers 32 for determining and/or providing instructions to the plurality of gensets 14. Each of the plurality of controllers 32 is operatively associated with at least one of the plurality of gensets 14. Additionally, each of the plurality of gensets 14 is operatively associated with at least one of the controllers 32. Each of the plurality of controllers 32 are used to control one or more gensets 14 by processing data and/or executing instructions individually, processing data and/or executing instructions in conjunction with one or more other controllers 32, and/or receiving instructions from another member of the plurality of controllers 32 and processing data and/or executing instructions based on the received instructions.

Each of the plurality of controllers 32 may be any electronic controller or computing system, including a processor, which operates to perform operations, execute algorithms, store data, retrieve data, gather data, and/or any other computing or controlling task desired. The plurality of controllers 32 each may be a single controller or may include more than one controller disposed to interact with other elements of the control system 30 and/or the power system 10.

Functionality of each of the plurality of controllers 32 may be implemented in hardware and/or software and may rely on one or more data maps. To that end, each of the controllers of the plurality of controllers 32 may include internal memory and/or each of the controllers of the plurality of controllers 32 may be otherwise connected to external memory, such as a database or server. Internal memory and/or external memory may include, but are not limited to including, one or more of read only memory (ROM), random access memory (RAM), a portable memory, and the like. Such memory media are examples of nontransitory memory media.

Figure 4:
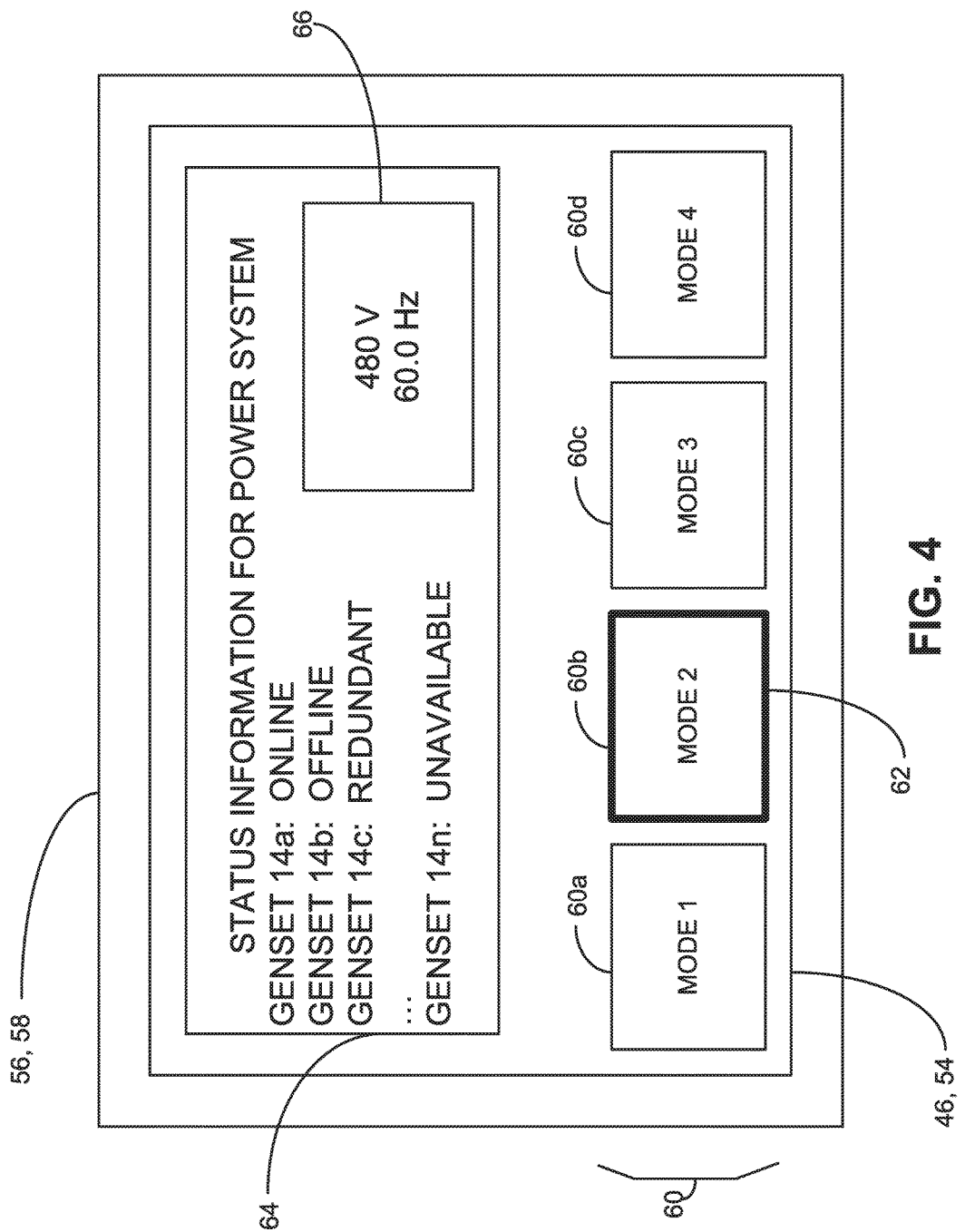
FIG. 4 is a simplified side view of a visual display associated with the control system(s) of FIGS. 1-3, displaying operating modes for components of the power system of FIG. 1, in accordance with the present disclosure.
Figure 5:
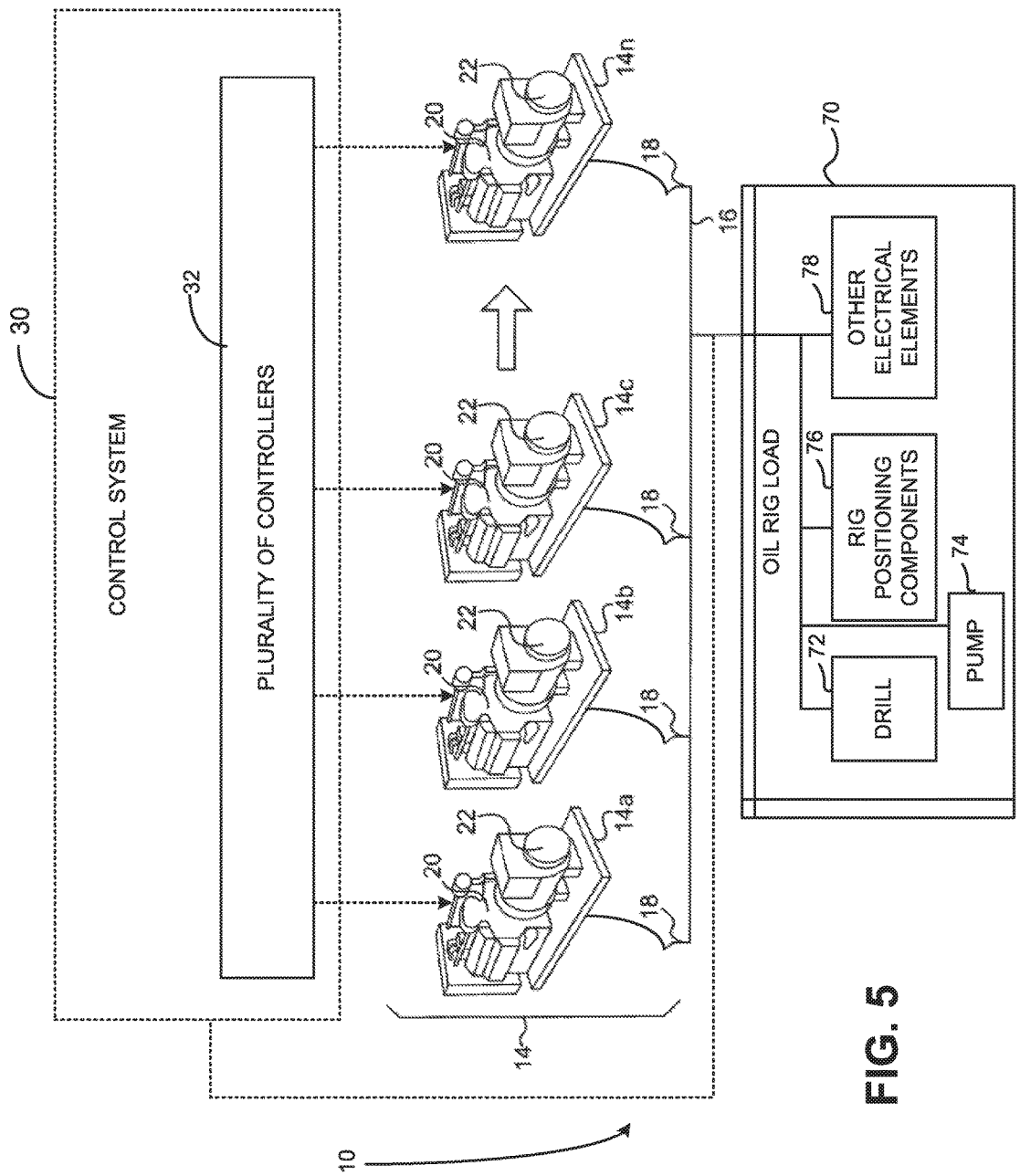
FIG. 5 is a schematic diagram of the example power system 10, in which the load that the power system provides power to is an oil rig, in accordance with an embodiment of the disclosure.

The plurality of controllers 32 may be configured to control power output, to the load 12, of the plurality of gensets 14. Such control of power output may be based on a plurality of operating modes, each of the plurality of operating modes configured for a power consumption scenario associated with the load 12. A "power consumption scenario," as defined herein, refers to power usage needs of the load 12, based on a current operating state of the load 12 and any systems, devices, and/or machines drawing power from the load 12. An example power consumption scenario may be a standby scenario, in which the load 12 is not performing an active, industrial task, and, thusly, low power output from the power system 10 may be used, in case it needs to boot up to a higher powered mode. Another example power consumption scenario may be an active task scenario, in which a critical task is performed and, therefore, the power system 10 may not only run the number of gensets 14 required to provide the required power, but may also run redundant gensets 14, to provide backup power to the non-redundant gensets 14, in case of genset 14 operation failure. Of course, these example power consumption scenarios are merely exemplary and each of the plurality of operating modes may be based on any power consumption scenario desired. Such power consumption scenarios may be based on any level of criticality, power safety, efficiency concerns, or any other factors deemed necessary for the specific load's application. A non-limiting example of power consumption scenarios, as related to operating modes for the power system 10, is illustrated in FIGS. 4-5 and described below.

Each of the plurality of controllers 32 may be connected to at least one other controller 32 of the plurality of controllers 32 via a datalink 34. The datalink 34 may be any data sharing or connecting system that allows the controllers 32 to communicate amongst themselves or with another controller or device. For example, the datalink 34 may employ Ethernet User Data Protocol (Ethernet UDP) communication linkage, may employ Modbus TCP/IP communication linkage, and/or may employ any communication linkage suitable for providing peer-to-peer communications amongst the plurality of controllers 32. Alternatively, the datalink 34 may employ the Modbus serial communication protocol to connect the controllers 32 for "master-slave" type communications, which is discussed in greater detail below with reference to FIG. 3.

Generally, the plurality of controllers 32 may operate in concert to select a current operating mode, from the plurality of operating modes, for the plurality of gensets 14. Selection of the current operating mode, by the plurality of controllers 32, may be based on one or more of internal logic of the plurality of controllers 32, input from one or more input device(s) 36, load sensing information from a load sense determiner 38 of the input device(s) 36, timing information that is either internal to one or more of the controllers 32 or provided to the controllers 32 by a clock 40, and/or any other logic, input, or information that can be used as a reason for setting an operating mode for the plurality of gensets 14 (examples of such factors in mode-selection are described in more detail below). Accordingly, once the current operating mode is selected for the plurality of gensets 14, the plurality of controllers 32 may control power output of at least one of the plurality of gensets 14 based on the current operating mode.

Turning now specifically to FIG. 2, an example block diagram of the control system 30 shows a first configuration for the plurality of controllers 32, denoted as the plurality of controllers 32a. The plurality of controllers 32a may include a plurality of genset controllers 42, each of the plurality of genset controllers 42 corresponding to one of the plurality of gensets 14 and being operatively associated with its corresponding member of the plurality of gensets 14. For example, as shown, a first genset controller 42a corresponds with and is operatively associated with the first genset 14a, a second genset controller 42b corresponds with and is operatively associated with the second genset 14b, and a third genset controller 42c corresponds with and is operatively associated with the third genset 14c. Of course, as the plurality of gensets 14 may include fewer than the three gensets 14a, 14b, and 14c or the plurality of gensets 14 may include any number of additional gensets 14, up to "n" number of gensets 14n, the plurality of genset controllers 42 may include fewer than the three genset controllers 42a, 42b, and 42c or the plurality of genset controllers 42 may include any number of additional genset controllers 42, up to "n" number of genset controllers 42n corresponding with and operatively associated with "n" number of genset controllers 42n.

In the context of the first configuration for the plurality of controllers 32a, the plurality of genset controllers 42 may be configured to communicate amongst themselves via, for example, the datalink 34. In some such examples, the plurality of genset controllers 42 may be configured as a peer-to-peer network of genset controllers 42, wherein each of the plurality of genset controllers 42 communicates with one another to perform control functions for the plurality of gensets 14. For example, using peer-to-peer communication amongst the plurality of genset controllers 42, such genset controllers 42 may exchange data and/or operating states to determine optimal genset control operations, based on the current operating mode and any additional data. For example, optimal genset control operations may include: instructions for which of the gensets 14 should be shut down or turned on next; instructions for optimal percentage of operating capacity, to achieve the requirements of the current mode. for one or more of the gensets 14; instructions for delaying genset 14 shut down or activation based on guidelines of the current operating mode and/or based on guidelines of internal logic of one or more of the plurality of genset controllers 42; variances in power output based on data input to the plurality of genset controllers 42; or any other operating factor that the plurality of genset controllers 42 may be configured to recognize.

However, the configuration for the plurality of controllers 32a of FIG. 2 is certainly not the only configuration possible. In contrast, as shown in FIG. 3, an alternative configuration for the plurality of controllers 32b is shown, wherein the plurality of genset controllers 42 are similarly correlated and operatively associated with the plurality of gensets 14; however, the plurality of genset controllers 42 are not necessarily configured for communication amongst themselves. Rather, the plurality of controllers 32b may further include a master controller 44. The master controller 44 may, generally, be configured to provide instructions, related to control of the plurality of gensets 14 and/or the operation modes, to the plurality of genset controllers 42. Accordingly, in some examples, the master controller 44 and the plurality of genset controllers 42 may be arranged, via the datalink 34, to have a "master/slave" relationship, wherein the master controller 44 is the "master" providing instructions to the "slave" plurality of genset controllers 42.

In such examples, the master controller 44 may be configured to determine optimal genset control operations based on the current operating mode. As discussed in greater detail above, "optimal genset control operations" may refer to any operating factor that the plurality of genset controllers 42 may be configured to recognize including, but not limited to, the example optimal genset control operations discussed above. Further, the master controller 44 may be configured to communicate the optimal genset control operations to the plurality of genset controllers 42. Upon receipt of the optimal genset control operations from the master controller 44, one or more of the plurality of genset controller 42 may then control their corresponding genset 14 in accordance with the optimal genset control operations.

With reference to both FIGS. 2 and 3, in some examples, the control system 30 may include the input device(s) 36, which is configured to generate load information associated with the load and provide the load information to the plurality of controllers 32. Load information may be any information associated with the load 12, such as, but not limited to, a current power consumption scenario of the load 12, electrical power desired by the load 12, electrical power required for operation of the load 12, capabilities or limits of power consumption for the load 12, and/or any other information associated with the load 12. In such examples, the plurality of controllers 32 may be further configured to receive the load information and select the current operating mode based on the load information. The input device(s) 36 may include any device capable of providing input or data associated with the load 12 or associated with a user's desired operation of the load 12, including, but not limited to, the load sense determiner 38 and digital input(s) 46.

In some examples, the load sense determiner 38 may be included, which is operatively associated with the transmission network 16. The load sense determiner 38 may be any sensor or device which is configured to determine load information by sensing power characteristics at the load 12, via the transmission network 16. Such power information may include current power input to the load 12, voltage and/or current input to the load 12, capacity for power input to the load 12, and any other information associated with the power input to the load 12.

Further, in some examples, the input device(s) 36 may include one or more digital inputs 46. The digital inputs 46 may include, but are not limited to including keys 48 (e.g., a keypad, a keyboard, any buttons or physically altered devices indicative of data input), a mouse (e.g., a computer mouse, track ball, track pad, or any device for navigating and selecting information on a display), and/or a touch screen (e.g., any visual display capable of providing an area thereon in which a user can interact with the screen in order to provide data or selections). When a digital input 46 is used, the digital input 46 may provide the load information to the plurality of controllers 32, based on input from a user. In some such examples, the load information provided by the digital input 46 may be mode selection information. Mode selection information may be information indicative of an operator selected operating mode for the plurality of gensets 14.

For example, in the depiction of an output device 56, more specifically a visual display 58, in FIG. 4, the touchscreen 54, of the input device(s) 46, may prompt a user with a selection of operating modes 60 for the plurality of gensets 14. By interacting with the touchscreen 54, the user may provide mode selection information 62 (indicated by the thickened border of "Mode 2" in comparison to the other modes), which is indicative of the operating mode 60b, in this example. Accordingly, in such examples, selecting the current operating mode, by the plurality of controllers 32, for the plurality of gensets 14, is based on, at least, the mode selection information 62. In such examples, the current operating mode selected by the plurality of controllers 32, may be the operator selected operating mode 62. However, in some examples, the plurality of controllers 32 may have internal logic or safeguards, related to the load 12, which will override the operator selected mode 62 to run the gensets 14 in accordance with a different operating mode.

Returning now to FIGS. 2 and 3, as mentioned above, the selection of the current operating mode, by the plurality of controllers 32, may be based on a schedule or other timing information, such as timing information provided by the clock 40 or an internal timer or clock of any of the plurality of controllers 32. In such examples, the plurality of controllers 32 may manage the current operating mode of plurality of gensets 14 based on said timing information, based on any preprogrammed logic or memory related to a schedule and/or based on any timing or scheduling information input to the plurality of controllers 32 by one or both of the clock 40 and the input device(s) 36.

In some examples, and as depicted in FIG. 4, the control system 30 may further include an output device 56, such as a visual display 58. While shown in FIG. 4 as integrated with the touchscreen 54, the output device 56 is certainly not limited to being integrated with the touchscreen 54. In such examples, the output device 56 may provide information to the user associated with the load 12 and/or the plurality of gensets 14 and their operating states. For example, the display 58 of FIG. 4 displays status information 64 relating to the power system 10 and displays electrical power information 66 associated with one or both of the power system 10 and the load 12.

INDUSTRIAL APPLICABILITY

In general, the foregoing disclosure finds utility in various industries, namely those in which a power system may be configured to provide primary power and/or backup power to an external load, by utilizing a plurality of gensets to provide said primary power and/or back up power. Accordingly, the power system 10 and its associated control system 30 may be utilized in any application in which it is desired to provide power to an external load. Examples of external loads that the systems and methods of the present disclosure may be applicable to include any type of power consuming system and/or device configured to receive electrical power supplied by the gensets 14, thereby utilizing the electrical power from the gensets 14 to perform some type of task. External loads may include, but are not limited to including, lights, motors, heating elements, electronic circuitry, refrigeration devices, air conditioning units, computer servers, heating equipment, motorized pulley systems, drilling equipment, positioning actuators, etc. For example, such external loads may include one or more systems and/or devices that utilize uninterrupted electrical power to perform one or more critical and/or sensitive tasks. Accordingly, in some such examples, such electrical loads that utilize uninterrupted power may include, but are not limited to including, loads found in hospitals, airports, computer servers, telecommunication installations, oil rig sites, drilling operations, and/or any industrial applications.

Figure 7:
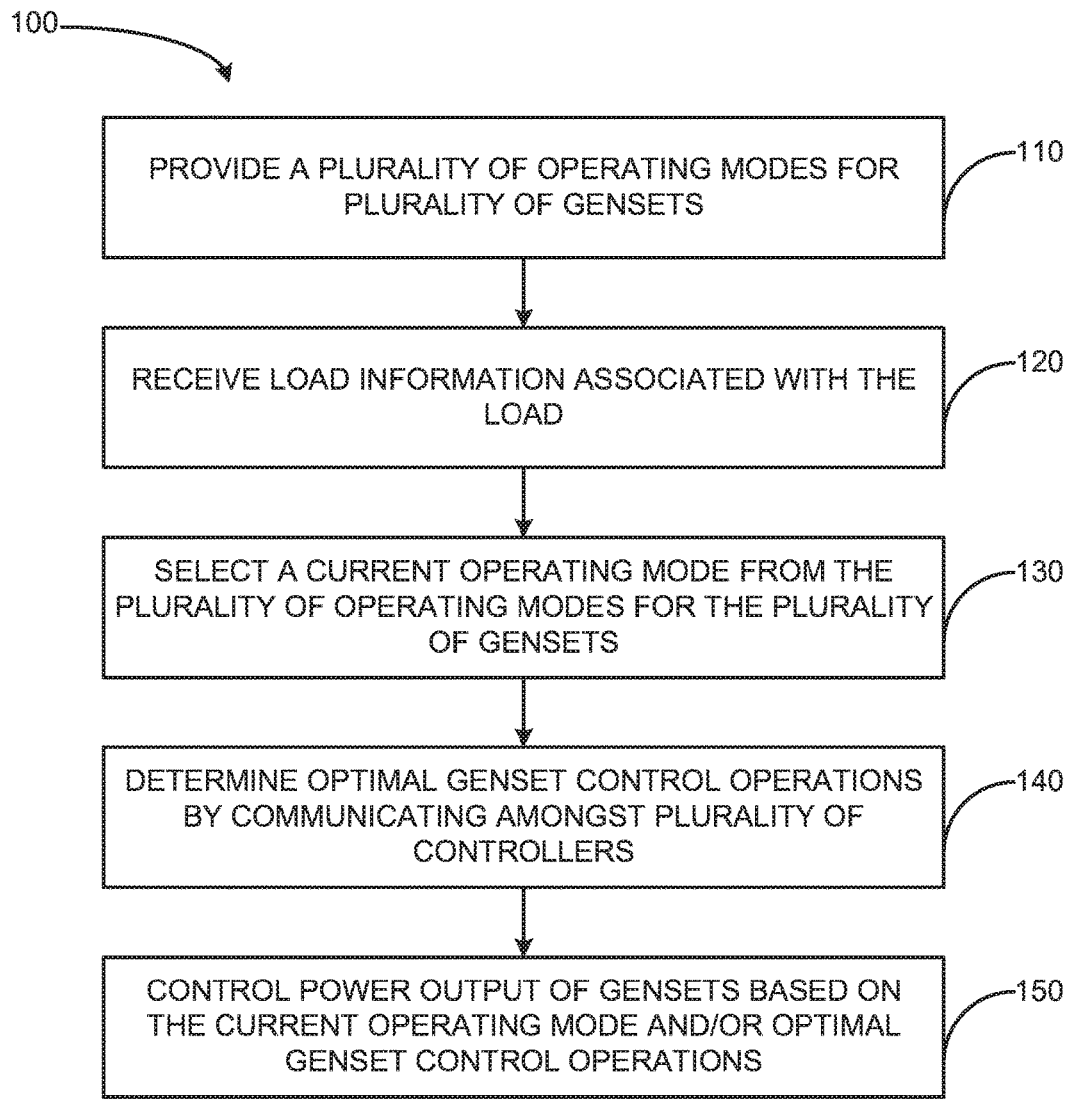
FIG. 7 is an example flowchart illustrating a method for controlling power output to a load by a plurality of generator sets, in accordance with an embodiment of the present disclosure.

As an example of an external load being powered by the power system 10, FIG. 7 depicts the power system 10 being configured to power an exemplary oil rig load 70. The oil rig load 70 may include a variety of elements, which may require electrical power and, accordingly, be powered as "sub-loads" of the oil rig load 70, such as, but not limited to a drill 72, a pump 74, rig positioning components 76, and any other electrical elements 78 that may require electrical power for operation. As shown, in powering the oil rig load 70, the power system 10 may utilize the control system 30 to optimize power output of the plurality of gensets 14.

More specifically, the control system 30 may utilize the plurality of controllers 32 to more accurately control the power input to the oil rig load 70, based on operation of the elements of the oil rig load 70. As depicted graphically as a display output by the output device 56 in FIG. 6, the plurality of controllers 32 may be configured to control power output from the plurality of gensets 14, to the oil rig load 70, based on the plurality of operating modes 60, wherein each of the plurality of operating modes is configured for one of a plurality of consumption scenarios 80, each of the plurality of consumption scenarios 80 associated with the oil rig load 70.

Accordingly, each of the plurality of operating modes 60 may be configured for optimal consumption, power loss criticality, redundancy availability, and/or any other power related tasks or conditions of the gensets 14. For example, the operating mode 60a may be associated with a standby consumption scenario 80a; in such scenarios, the oil rig load 70 may not be using a great deal of power and, therefore, lower powered gensets 14 and/or fewer gensets with less redundancy may be used. In another example, the operating mode 60b may be associated with a drilling consumption scenario 80b; in such a scenario, a drill may utilize a high level of power from the genset 14, but failure of power (e.g., blackout conditions, brown out conditions, or any power loss conditions) would lower production, so some redundancies of gensets 14 may be necessary. Further, operating mode 60c is associated with a tripping consumption scenario 80c, in which tripping of components is performed and, thusly, it is of the utmost importance that power does not fail and, therefore, many genset 14 redundancies may be used. The operating mode 60d is configured to be associated with a back reaming consumption scenario 80d, in which redundancies are necessary to prevent product loss.

Figure 6:
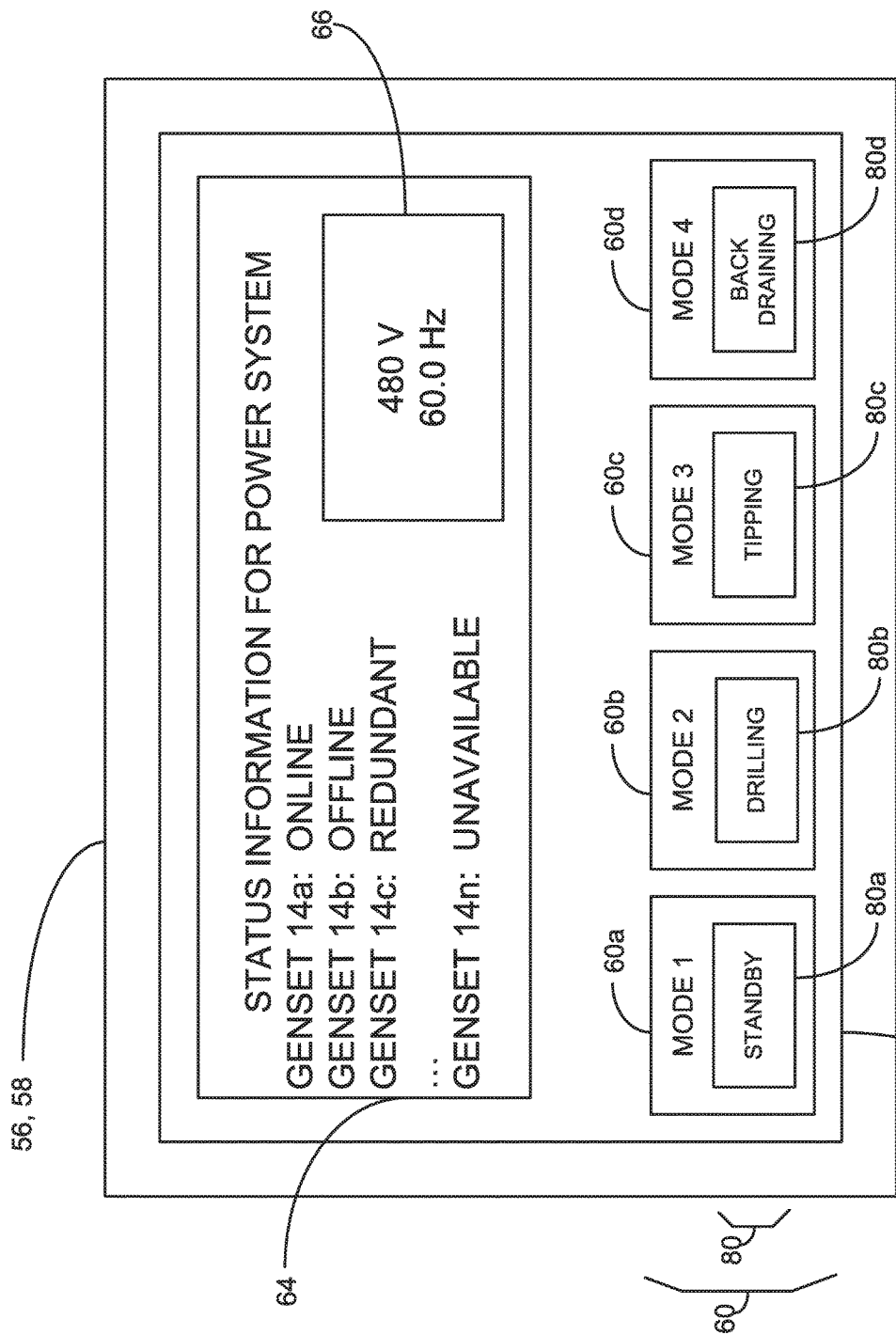
FIG. 6 is a simplified side view of a visual display associated with the control system(s) of FIGS. 2 and 3 and the power system of FIG. 5, displaying operating modes for components of the power system of FIG. 5 as they relate to operating modes for the oil rig, in accordance with the present disclosure.

Of course, the operating modes 60 are infinitely configurable to any task for industrial work on industrial sites and the examples depicted in FIGS. 5 and 6 and the descriptions above are merely exemplary. By utilizing the control system 30 to control the gensets 14 as they provide power to the load 12, utilizing the operating modes 60, worksite efficiency may be achieved by utilizing operating modes 60 that improve fuel efficiency, utilizing operating modes that ensure it is unlikely for power input to fail during critical tasks of the load 12, and/or by utilizing modes that will protect the wear and life of the gensets 14 by limiting over-work of individual gensets 14.

To achieve these advantages, the control system 30 for controlling the plurality of gensets 14 may be utilized in addition to or in conjunction with a method 100 for controlling power output to the load 12 by the plurality of gensets 14, which is depicted as a flowchart in FIG. 7. While the description of the method 100 presented below references elements of the control system 30 and the power system 10, the method 100 may be executed using alternative elements and should not be construed as limited to execution via the control system 30, the power system 10, and/or components thereof.

The method 100 may include providing a plurality of operating modes 60, wherein each of the plurality of operating modes 60 is configured for a power consumption scenario associated with the load 12, as depicted in block 110. In some examples, the plurality of controllers 32 may receive load information associated with the load 12, as depicted in block 120. The method 100 includes selecting a current operating mode, from the plurality of operating modes 60, for the plurality of gensets 14, as depicted in block 130. In some examples, selecting the current operating mode, from the plurality of operating modes 60, for the plurality of gensets 14, may be based on the load information.

By communicating information amongst the plurality of controllers 32, the method 100 may determine optimal genset control operations based on the current operating mode, as depicted in block 140. Further, power output of the plurality of gensets 14 may be performed based on the current operating mode and/or the optimal genset control operations, as depicted in block 150.

It will be appreciated that the present disclosure provides systems and methods for object detection, which utilize a learned object detection process, and methods for determining such a learned object detection process. While only certain embodiments have been set forth, alternatives and modifications will be apparent from the above description to those skilled in the art. These and other alternatives are considered equivalents and within the spirit and scope of this disclosure and the appended claims.

What is claimed is:

1. A control system for a plurality of generator sets (gensets), the plurality of gensets configured to provide power to a load, the system comprising:
a plurality of controllers, each of the plurality of controllers operatively associated with at least one of the plurality of gensets and each of the plurality of gensets being operatively associated with at least one of the plurality of controllers, the plurality of controllers being configured to control power output to the load of each of the plurality of gensets based on a plurality of operating modes for the load, wherein each of the plurality of operating modes for the load are configured for a power consumption scenario associated with the load; and
a datalink connecting each of the plurality of controllers to at least one other controller of the plurality of controllers,
wherein the plurality of controllers are configured to:
select a current operating mode for the load, from the plurality of operating modes, wherein selecting the current operating mode for the load is based at least in part on a current operating state of the load;
determine which gensets of the plurality of gensets are available for outputting power to the load;
select at least one genset of the available gensets to be active or redundant based on the power consumption scenario for the current operating mode for the load; and
control power output of at least one of the active or redundant gensets based on the power consumption scenario for the current operating mode for the load.

2. The control system of claim 1, wherein the plurality of controllers includes a plurality of genset controllers, each of the plurality of genset controllers corresponding to one of the plurality of gensets and being operatively associated with said corresponding one of the plurality of gensets, and wherein each of the plurality of genset controllers communicate amongst themselves to determine optimal genset control operations based on the current operating mode.

3. The control system of claim 2, wherein a first genset controller, of the plurality of genset controllers, is configured to instruct a first genset, of the plurality of gensets, to power on and communicate with at least one other genset controller, of the plurality of genset controllers, to determine the current operating mode for the load, of the plurality of operating modes, based upon which the first controller will control a power output of the first genset.

4. The control system of claim 1, wherein the plurality of controllers includes a master controller and a plurality of genset controllers, each of the plurality of genset controllers corresponding to one of the plurality of gensets and being operatively associated with said corresponding one of the plurality of gensets, and wherein the master controller is configured to:
determine optimal genset control operations based on the current operating mode for the load, and
communicate the optimal genset control operations to each of the plurality of genset controllers, and
wherein each of the plurality of genset controllers is configured to control power output of its respective genset of the plurality of gensets based on the optimal genset control operations.

5. The control system of claim 1, further comprising an input device configured to generate load information associated with the load and provide the load information to the plurality of controllers, wherein the plurality of controllers are further configured to receive the load information; and wherein selecting the current operating mode for the load, from the plurality of operating modes, by the plurality of controllers, for the plurality of gensets is based on the load information.

6. The control system of claim 5, wherein the input device includes a load sense determiner operatively associated with a transmission network that is associated with the plurality of gensets, and wherein the load sense determiner is configured to determine the load information by sensing power characteristics at the load via the transmission network.

7. The control system of claim 5, wherein the input device includes a digital input, wherein the digital input is configured to provide the load information to the plurality of controllers, based on input from a user.

8. The control system of claim 7, wherein the load information provided by the digital input is mode selection information indicative of an operator selected operating mode for the load, and wherein selecting the current operating mode for the load, from the plurality of operating modes, by the plurality of controllers for the plurality of gensets is based at least in part on the mode selection information.

9. The control system of claim 8, wherein the current operating mode for the load selected by the plurality of controllers is the operator selected operating mode, and wherein the plurality of controllers are configured to override the operator selected operating mode for the load and select a different operating mode for the load based on an internal logic.

10. The system of claim 1, wherein selecting the current operating mode for the load, from the plurality of operating modes, by the plurality of controllers for the plurality of gensets is based at least in part on a schedule associated with the load.

11. A power system for providing electrical power to an external load, the power system comprising:
a plurality of gensets configured to generate electrical power for the external load;
a transmission network configured to provide the electrical power generated by the plurality of gensets to the external load;
a plurality of controllers, wherein each of the plurality of controllers is operatively associated with at least one of the plurality of gensets, and wherein each of the plurality of gensets is operatively associated with at least one of the plurality of controllers, wherein each of the plurality of controllers is configured to control power output to the external load of each of the plurality of gensets based on a plurality of operating modes for the external load, and wherein each of the plurality of operating modes for the external load is configured for a power consumption scenario associated with the external load;
a datalink connecting each of the plurality of controllers to at least one other controller of the plurality of controllers,
wherein the plurality of controllers are configured to:
select a current operating mode for the external load from the plurality of operating modes for the external load for one or more active gensets of the plurality of gensets, wherein the current operating mode for the external load for each of the active gensets is at least partially based on a determination of available gensets; and control power output of at least one of the available gensets based on the power consumption scenario for the current operating mode for the external load.

12. The power system of claim 11, wherein at least one of the plurality of gensets includes:
   a prime mover configured to mechanically rotate; and
   a generator coupled to the prime mover and configured to generate electrical power in response to mechanical rotation of the prime mover.

13. The power system of claim 11, wherein the external load is associated with an oil rig and each of the plurality of operating modes for the external load are configured for a power consumption scenario associated with the oil rig.

14. The power system of claim 13, wherein one of the plurality of operating modes for the external load is a standby mode, the standby mode being associated with a standby power consumption scenario in which lower powered gensets of the plurality of gensets are used.

15. The power system of claim 13, wherein one of the plurality of operating modes for the external load is a drilling mode, the drilling mode being associated with a drilling power consumption scenario in which one or more genset redundancies are used.

16. The power system of claim 13, wherein one of the plurality of operating modes for the external load is a tripping mode, the tripping mode being associated with a tripping power consumption scenario in which a plurality of genset redundancies are used.

17. The power system of claim 13, wherein one of the plurality of operating modes for the external load is a back reaming mode, the back reaming mode associated with a back reaming power consumption scenario in which active gensets and redundancies are used to prevent product loss.

18. The power system of claim 11, further comprising an input device configured to generate load information associated with the load and provide the load information to the plurality of controllers,
   wherein the plurality of controllers are further configured to receive the load information, and
   wherein selecting the current operating mode for the external load, from the plurality of operating modes, by the plurality of controllers, for the plurality of gensets is based on the load information.

19. A method for controlling power output to a load by a plurality of gensets, the method comprising:
   providing a plurality of operating modes, wherein each of the plurality of operating modes is configured for a power consumption scenario associated with the load;
   selecting a current operating mode, from the plurality of operating modes, for the plurality of gensets;
   communicating, amongst a plurality of controllers, to determine optimal genset control operations based on the current operating mode, wherein each of the plurality of controllers is operatively associated with at least one of the plurality of gensets;
   controlling a power output of at least one of the plurality of gensets based on the current operating mode and the optimal genset control operations; and
   displaying the power output of the at least one of the plurality of gensets on a user interface, wherein displaying the power output includes displaying the current operating mode and whether each genset is online, offline, redundant, or unavailable.

20. The method of claim 19, further comprising a step of receiving load information associated with the load, and
   wherein selecting the current operating mode, from the plurality of operating modes, for the plurality of gensets, is based on the load information.

* * * * *